United States Patent
Crosby et al.

(10) Patent No.: US 7,012,621 B2
(45) Date of Patent: Mar. 14, 2006

(54) METHOD AND APPARATUS FOR RENDERING A LOW-RESOLUTION THUMBNAIL IMAGE SUITABLE FOR A LOW RESOLUTION DISPLAY HAVING A REFERENCE BACK TO AN ORIGINAL DIGITAL NEGATIVE AND AN EDIT LIST OF OPERATIONS

(75) Inventors: Matt Crosby, Vashon, WA (US); David C. Wilkins, Providence, RI (US)

(73) Assignee: Eastman Kodak Company, Rochester, NY (US)

(*) Notice: Subject to any disclaimer, the term of this patent is extended or adjusted under 35 U.S.C. 154(b) by 92 days.

(21) Appl. No.: 10/946,967

(22) Filed: Sep. 22, 2004

(65) Prior Publication Data

US 2005/0052469 A1 Mar. 10, 2005

Related U.S. Application Data

(63) Continuation of application No. 09/724,780, filed on Nov. 28, 2000, now Pat. No. 6,870,547.
(60) Provisional application No. 60/172,301, filed on Dec. 16, 1999.

(51) Int. Cl.
*G06K 9/32* (2006.01)
*G06K 9/60* (2006.01)
*H04N 5/222* (2006.01)
*G09G 5/00* (2006.01)
*G09G 5/02* (2006.01)

(52) U.S. Cl. .............. 345/619; 345/629; 345/698; 382/299; 382/302; 348/333.11
(58) Field of Classification Search ........... 345/619, 345/600, 698; 382/299, 302; 348/333.11
See application file for complete search history.

(56) References Cited

U.S. PATENT DOCUMENTS

| | | | | | |
|---|---|---|---|---|---|
| 6,101,265 | A | * | 8/2000 | Bacus et al. | 382/133 |
| 6,232,973 | B1 | * | 5/2001 | Dow et al. | 715/810 |
| 6,272,235 | B1 | * | 8/2001 | Bacus et al. | 382/133 |
| 6,441,927 | B1 | * | 8/2002 | Dow et al. | 358/473 |
| 2001/0026644 | A1 | * | 10/2001 | Endo et al. | 382/282 |

* cited by examiner

*Primary Examiner*—Matthew C. Bella
*Assistant Examiner*—Anthony J. Blackman
(74) *Attorney, Agent, or Firm*—Frank Pincelli

(57) ABSTRACT

A method of rendering a low-resolution thumbnail image at an embedded imaging device is described. An original digital negative is captured at the embedded imaging device at an original resolution and a thumbnail digital image of the original digital negative is generated at a first resolution. The thumbnail digital image is displayed on a display device coupled to the embedded imaging device and modified to form a first resultant image at the first resolution. A first edit list based upon the modifying is generated and associated with the first resultant image and linked to the original digital negative. The linked first edit list, the original digital negative, and the first resultant image are stored at the embedded imaging device and displayed at the display device.

1 Claim, 9 Drawing Sheets

METHOD AND APPARATUS FOR RENDERING A LOW-RESOLUTION THUMBNAIL IMAGE SUITABLE FOR A LOW RESOLUTION DISPLAY HAVING A REFERENCE BACK TO AN ORIGINAL DIGITAL NEGATIVE AND AN EDIT LIST OF OPERATIONS

CROSS REFERENCE TO RELATED APPLICATIONS

This is a continuation of application Ser. No. 09/724,780 filed Nov. 28, 2000 now U.S. Pat. No. 6,870,547 which claims benefit of priority under 35 U.S.C. 119(e) of U.S. Provisional Application No. 60/172,301, filed Dec. 16, 1999 and entitled "TECHNIQUES FOR USING DATA ASSOCIATED WITH A DIGITAL IMAGE SUITABLE FOR RASTERIZATION AT ANY RESOLUTION ON DEMAND" which is incorporated by reference in its entirety.

BACKGROUND OF THE INVENTION

1. Field of Invention

The invention relates generally to digital image processing systems. More particularly, methods and apparatus for selectively processing a digital image are disclosed. More particularly, the invention provides techniques that for rendering a low-resolution thumbnail image suitable for a low resolution display having a reference back to an original digital negative and an edit list of operations 2. Description of Relevant Art When a user performs image operations using digital image processing programs such as Adobe Photoshop™ or PhotoDeluxe™, image operations are performed directly on the raw pixels of the image. Since most imaging applications only perform image operations on one resolution, usually the highest resolution, these operations are sometimes very slow, even on the fastest computers. If an application could work at a lower resolution for display purposes, the processing time would significantly decrease, thus increasing the productivity of the user. While it is sometimes possible for an application to work on lower-resolution image data, when the image with all the applied image operations is to be saved, the full-resolution image data must be processed at that time. If this step were not performed, the saved image would only contain low-resolution image data. While this is one option, this is not desired since it would not be possible to obtain an image rasterized at a higher resolution.

In general, an application is forced to generate one resolution (usually the highest), even though lower-resolution data could be used since the output may be targeted to a low-resolution display device and not a high-resolution printer. Unfortunately, it is not possible for the application to know apriori how the image will be used in the future, thus a high-resolution image is usually created.

A more desirable solution would be if a low-resolution (i.e. resultant) image could be generated based on the sequence of image operations, but with "knowledge" about the original high-resolution image (i.e. the digital negative) as well as the list of image operations (i.e. the edit list). The digital negative is the user's original, unmodified image stored at the highest resolution possible. The edit list is a sequence of image operations or image transforms that are to be applied to an image. The resultant image is the result of applying the specified edit list applied to the digital negative at some specified resolution, which includes a reference (i.e. internal or external link) to the digital negative along with the optional edit list.

There have been recent developments in technology that have attempted to solve this problem. An imaging application that supports FlashPix™ technology, developed by a consortium of companies comprising of the Digital Imaging Group (DIG), can display and manipulate on-screen images at a lower-resolution, but retains access to the higher-resolution image data. The FlashPix™ file contains the following items: (a) the original higher-resolution image data, (b) a very limited set of image transforms (such as, rotation, translation, cropping, color twist, blur/sharpen adjustment, brightness/contrast adjustment), and (c) an optional resultant image. While this appears to resolve the problems listed above, there are several limitations. The most important of which is that the original image data, the image transforms, and the optional resultant image are stored together in one central file. This does not provide for a distributed imaging architecture as describe by the invention, nor is it a lightweight solution needed for transmission of images in a low-bandwidth network environment. Additional limitations of FlashPix are that the file format is based on a proprietary, complex format referred to as COM/Structured Storage which, in the current form used by FlashPix™, does not support the ideas put forth by this invention. Further, the image transforms supported are limited to a few operations. The solution described by this invention provides a much more flexible model.

Other attempts have been made that try to remedy the problem outlined above, but with limited success. The Internet Imaging Protocol (IIP) has been developed that provides for optimized access and display of a FlashPix files over the network. When using IIP, a FlashPix file that resides on a serve can be efficiently rendered. A client (i.e. Web browser) must contain executable code (such as a Java applet, ActiveX control, or browser plug-in) that allows it to request portions of the FlashPix file. This involves downloading of fully rendered tiles or portions of the image at different resolutions. While this does provide for efficient display of a FlashPix file over a low bandwidth network connection, it does not solve the generate problem of linking the low-resolution resultant image file back to the high-resolution digital negative and edit list. IIP is simply a method for serving up and viewing large FlashPix files over the network in an efficient manner.

Other variants of FlashPix exist, including LivePicture's FITS technology. The FITS format allows the image operations to be performed on low-resolution image data and saved, thus eliminating the need to do a time consuming render of the high-resolution image data when saving the file. The re-rendering at high resolution is done once the output resolution is determined. However, it does not solve the general problem of linking the low-resolution resultant image file back to the high-resolution digital negative and edit list.

In addition to providing general improvements for distribution of images, there are several web-based imaging solutions that are greatly enhanced by incorporation of this invention, but up until now could not provide similar novel functionality.

A variety of companies offer creation and distribution of on-line greeting cards (Blue Mountain Arts, Yahoo, etc.) and calendars. Some also offer the ability to customize cards and calendars by compositing a personal photo with their content. In general, these are offered as a free service and utilize low-resolution content and/or user's photos. Even if a high-resolution photograph were uploaded, it might be downsampled and composited with the greeting card artwork. This composition, in low-resolution form, is then sent, possibly through e-mail, to the recipient of the card or calendar.

This becomes even more important as higher-quality on-line content providers (i.e. Corbis, Getty, etc.) enter into this space. These companies can offer much higher quality content, but expect to be compensated if this content is taken advantage of. One model might involve users creating greeting cards or calendars, optionally composited with their photos, but only low-resolution resultant output (and optionally with a watermark) to be generated and distributed for free.

Peer-to-peer Web-based file sharing is a model that is becoming increasingly popular. Several applications now exist today, including Gnutella (OpenSource application for peer-to-peer file sharing) and Napster (peer-to-peer audio sharing). A same opportunity exists for direct peer-to-peer sharing of image files. As with any of these applications, and more problematic for images, is that the size of the files could result in an almost unusable user experience when image data is transferred over low-bandwidth network connections. Since pure peer-to-peer (no central intermediate image cache) involves direct connection between two or more end-user's computing devices, the requirement of transferring a large amount of image data, even on a high-bandwidth connection, almost makes this idea infeasible.

For photos today shared using direct peer-to-peer connections, the option is either send the high-resolution image that results in slow transmission or a low-resolution image that is faster, but poorer quality. There is no direct way to send a low resolution image, but with an automatic method of accessing the high-resolution image data if needed.

Embedded imaging devices can also take advantage of this invention to provide increased functionality and performance not possible today. Today certain digital cameras, including the Kodak DC265 and DC290, provide in-camera image processing software support. With this software, a user can apply specific effects or other image processing operations to an image after it has been captured. Although only a small thumbnail of the image can be viewed on the LCD screen, the full resolution image must be processed and stored in the camera memory (such as a CompactFlash card). While it might be possible to perform an optimization step that allows the low-resolution thumbnail to be generated so it can be quickly displayed on the LCD screen, the full-resolution image must still be processed and stored in the camera memory. Even worse, if the original image is also to be retained, two copies of the high-resolution image must be stored (the original and the one with the image operation applied).

What is desired is to only render a low-resolution thumbnail image, used for display in the LCD, with a reference back to the original digital negative and edit list of operations. In this way, only a small low-resolution thumbnail image, an edit list, and the original digital negative are actually saved to the camera memory.

SUMMARY OF THE INVENTION

The invention relates to an improved method, apparatus and system that allows for rendering and storing at an embedded imaging device, such as a camera, a low-resolution thumbnail image with a reference back to the original digital negative and edit list of operations.

A method of rendering a low-resolution thumbnail image at an embedded imaging device is described. In one embodiment, an original digital negative is captured at the embedded imaging device at an original resolution and a thumbnail digital image of the original digital negative is generated at a first resolution. The thumbnail digital image is displayed on a display device coupled to the embedded imaging device and modified to form a first resultant image at the first resolution. A first edit list based upon the modifying is generated and associated with the first resultant image and linked to the original digital negative. The linked first edit list, the original digital negative, and the first resultant image are stored at the embedded imaging device and displayed at the display device.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

Figure 1:
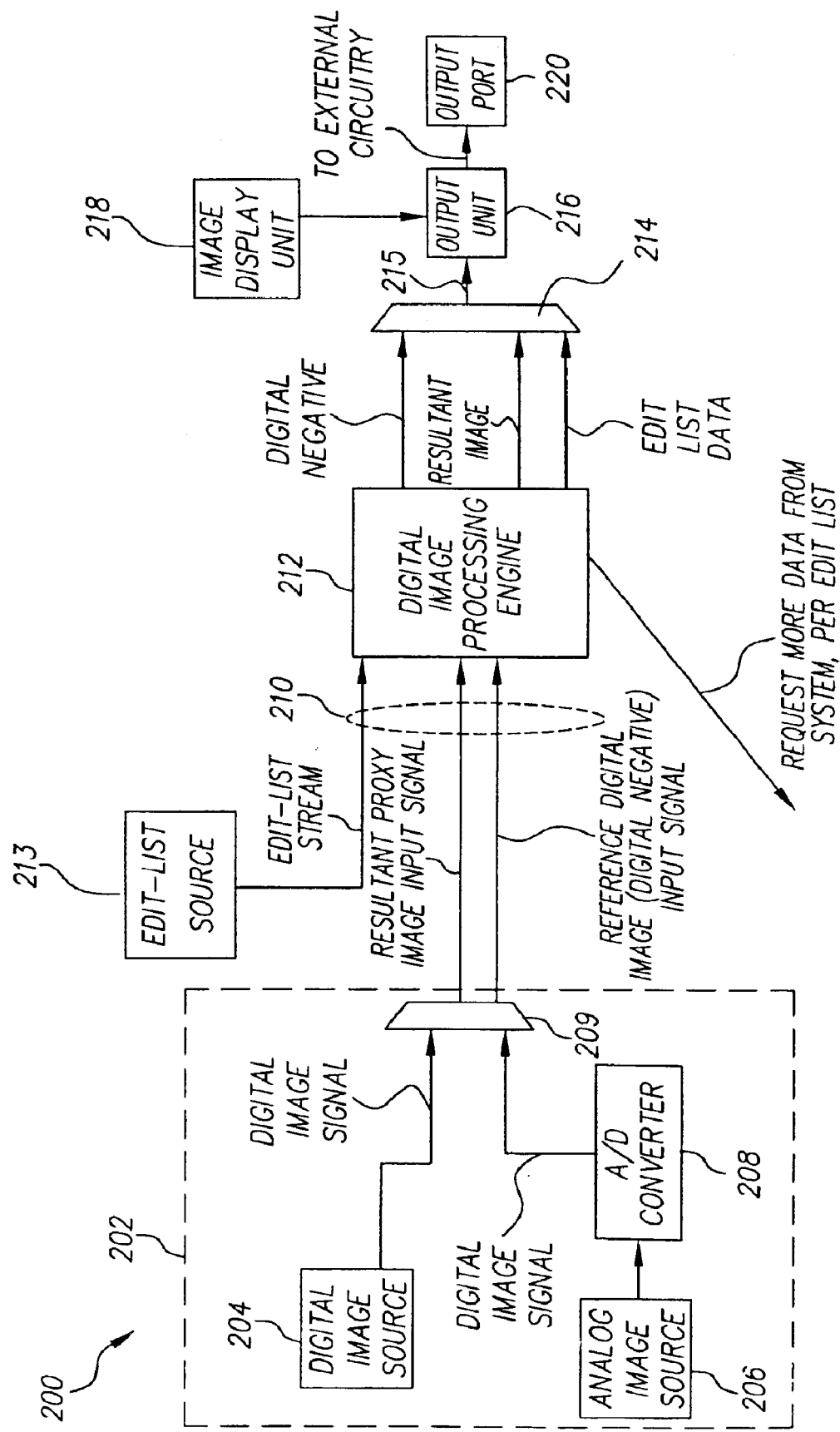
FIG. 1 shows a block diagram of a digital image processor system in accordance with an embodiment of the invention is shown.

Broadly speaking, the invention relates a novel approach and mechanism that allows a low-resolution digital greeting card image or digital calendar image to contain a link to an associated original digital negative and edit list Unlike conventional approaches to image editing, the distributed nature of the invention provides substantially improved flexibility. More specifically, the entire high-resolution image must not always be rasterized or distributed, since through this invention, it is possible to easily obtain access to the digital negative and edit-list of operations, thus allow additional resolutions to be generated on-demand as needed by an application or output device. Furthermore, in a distributed system utilizing, for example, the Web, CD media, or directly from a digital camera or other imaging appliance device, the invention provides that a user's digital negative can reside anywhere within this distributed system. In this case, a low-resolution image object can be distributed that will facilitate very fast download and display since it may be of a much smaller size compared to the original high-resolution image.

The image object may contain a proxy raster image, or resultant image, of its contents in any industry standard format (i.e. JPEG, TIFF, PNG, etc) provided on-demand rasterization is not available. The proxy raster image can be a fully rendered image of the digital negative with the image operations specified by the edit list applied at some resolution. This allows for very fast download and immediately display of the image, since it most likely will be of a lower resolution with possibly a higher compression ratio. In the described embodiment, a low-resolution (i.e. resultant) image could be generated based on the sequence of image operations, but with "knowledge" about the original high-resolution image (i.e. the digital negative) as well as the list of image operations (i.e. the edit list). The digital negative is the user's original, unmodified image stored at the highest resolution possible. The edit list is a sequence of image operations or image transforms that are to be applied to an image. The resultant image is the result of applying the specified edit list applied to the digital negative at some specified resolution, which includes a reference (i.e. internal or external link) to the digital negative along with the optional edit list.

Further, in a preferred embodiment, it will be in an industry standard format, thus allowing it to be displayed by most applications and Web browsers. More importantly, if the digital negative or edit list associated with the proxy image are not available, the user will still have a preview of what the image composition should look like. This allows a user to view the proxy image (or image composition) at a given resolution, using a standard application, but retains its ability to be rasterized at a higher resolution at a later time, based on specific application or device requirements. It is important to note that this invention works within the framework of existing industry standards, thus allowing any application to view the proxy image if the application does not have support for the architecture outlined by this invention.

It should be noted, when an application displays the resultant proxy image, either because the original image cannot be re-resterized or the application requires immediate display of the resultant proxy image, the proxy image might not actually match the resolution of the output device. If this occurs, the resultant proxy image can easily be resampled to match the resolution of the output device, a process well known in the art.

This is particularly advantageous when viewing images over a network. If two end-user computers are configured in a peer-to-peer connected environment, such that sharing of photos and other multi-media objects are permitted, this invention will create a much more desirable experience, since only low-resolution photos need to be transmitted. It is only when a user needs access to higher resolution image data, such as when printing or zooming into an image, does the higher resolution data need to be optionally accessed. Even in a situation where a user is viewing photos from a central photos sharing service on a network, such as Zing-.com or Kodak's PhotoNet, this invention will permit users quick access to the lower-resolution image data, but retains the ability to access higher resolution image data.

It should be noted that an additional advantage of the invention is that the resultant proxy image can be very small and dependent upon a specific device. For example, the resultant proxy image derived from a set of edit operations applied by a digital camera having a small LCD display may in fact be a low-resolution thumbnail image. In this way, the resultant proxy image will be properly displayed and optimized for the LCD display on the camera. By using a linked edit list, the editing operations can be applied on the full resolution version of the original high-resolution image (i.e., the digital negative) at a later time whenever a higher-resolution resultant image is needed. Clearly then, two of the benefits from this approach are that the image processing operations are very quick since only those pixels identified by the editing operations at a given resolution are processed resulting in a smaller resultant proxy image thereby preserving in-camera memory storage space.

Based on the editing operation, the software application may require a much smaller number of pixels from the digital negative if the editing operation can be performed in a resolution-independent manner. This provides for more efficient CPU utilization for processing of operations. Additionally, when the actual image data of the digital negative is requested in a distributed environment, higher network utilization is possible since lower-resolution image data can be transmitted between two computing devices provided the output device is lower resolution than the original digital negative.

However, for cases in which the editing operation is not resolution-independent, the software performing the operation may choose to access more pixels from the digital negative for the editing operation, but resample (reduce the number of pixel in) the output image after the editing operations have been performed, thus resulting in smaller resultant proxy image.

In general, the "edit list" is normally associated with a resultant image, such that the resultant image can be recreated at a desired resolution as needed. This "edit list" contains all the necessary information about how to perform this reconstruction. It will include the reference(s) to the digital negative(s) and any additional multimedia assets needed for this reconstruction. It should be noted that several multimedia assets (including several digital negatives such as still images, video images, vector artwork, test, etc.) might be required for this reconstruction. This is because the resultant image may be a composite of more than one multimedia asset.

It will also contain an optional list of editing operations that must be performed. The "edit list" can be considered both the "glue" that identifies all digital negatives and other multimedia assets that are needed to reconstruct the resultant image and the "script" on how the digital negatives and other multimedia assets are rendered such that the resultant image can be recreated, at the current resolution of the resultant image or at a different resolution.

It should be realized that an "edit list" can take the form of a variety of different embodiments, three of which are described below. This is meant to describe different variants of an edit list, but not an all-inclusive list. The first embodiment is a list that describes a set of individual operations that are to be performed on a given photo. These edit operations can be applied to a photo to generate the resultant image at the desired output resolution. The advantage of this structure is that new edits can be added to the end of the list or removed from the end of the list through an "undo" operation. A first sample piece of XML code is included for illustrative purposes:

```
<!-- Edit list example that consists of a list of operations applied -->
<!-- This example demonstrates when the edit list is a list of sequential
operations -->
<!-- that is applied to the digital negative. In the example below, an
operation can -->
<!-- be applied more than once, and in any order. This follows the
conventional -->
<!---model of a list of operations as entered by the user in which the list
can be -->
<!---at a later time undone if desired (via an undo operation). -->
<PICTURE-IQ-EDIT-LIST>
<DIGITAL-NEGATIVE-LINK type="highest_resolution" height="1600"
width="1200"
    href="www.pictureiq.com/samples/nicholas.jpg" content-
type="image/jpeg" />
<EDIT-SCRIPT type="sequential_list_of_operations">
<!-- auto_fix is an operation that is applied to the digital negative, and
does -->
<!-- not take any parameters -->
<EDIT-COMMAND type="auto_fix"/>
<!-- color_adjustment is applied to the digital negative, with the following
parameters -->
<EDIT-COMMAND type="color_adjustment" red="10" green="-20"
blue="50" />
<!-- next a warp is applied with the following parameter -->
<EDIT-COMMAND type="warp" amount="20" />
<!-- finally, another color_adjustment command is specified -->
<EDIT-COMMAND type="color_adjustment" red="-10" green="00"
blue="50" />
</EDIT-SCRIPT>
```

An alternative embodiment is to use this list to represent a state description of each operation applied to the photo, in which certain operations can be turned on or off. Each operation can still have an optional parameter list associated with the command, but there is a single "state" for the operation. It is either "on" or "off", and if "on", it can have a parameter associated with it. The advantage of this structure is that the operations and the interaction between the operations are clearly defined by the structure, thus providing consistent results regardless of the order that the user has applied the operations. Either the XML syntax could define the order in which the operations are performed, similar to the first embodiment, or the application can define it, independent of the order in which they appear in the XML file. The key point is that each operation is either "on" or "off" and would normally not appear more than once on the edit list. A second sample piece of XML code is included for illustrative purposes:

```
<!-- Edit list example that consists of a state description of available -->
<!-- operations each operation is either "on" or "off", with its specified -->
<!-- parameter list each operation should only be specified once and the --
>
<!-- order in which it is applied can be strictly specified by the application
-->
<PICTURE-IQ-EDIT-LIST>
<DIGITAL-NEGATIVE-LINK type="highest_resolution " height="1600"
width="1200"
    href="www.pictureiq.com/samples/nicholas.jpg" content-
type="image/jpeg" />
<EDIT-SCRIPT type="state_description_of_operations">
<!-- warp is specified, with its parameter, but is currently not enabled -->
<!-- (active). If the user enabled warp again, the application could -->
<!-- use either a preset value or the one specified in this file (20), -->
<!-- as required by the application. -->
<EDIT-COMMAND state="off" type="warp" amount="20" />
<!-- color_adjustment and auto_fix are both enabled and applied to
the -->
<!-- digital negative. -->
<EDIT-COMMAND state="on" type="color_adjustment" red="10"
```

-continued

```
green="-20" blue="50" />
<EDIT-COMMAND state="on" type="auto_fix"/>
</EDIT-SCRIPT>
</PICTURE-IQ-EDIT-LIST>
```

A third embodiment combines the benefits of the first two embodiments. The edit list not only represents the state description of operations, but also includes the ability for one or more of the operations that are part of the state description to be a list of individual operations that are to be applied to the photo, thus merging the two methods It should be noted, this architecture also allows an application to describe access to multiple resolutions of a digital negative from a single file. For example, multiple resolutions of the same image (at different resolution) could be externally linked via the "edit list" that describes the cross-reference between the various distributed image files. In this case, the "edit list" is the "glue" that holds the structure indicative of how each file is interrelated, but not necessarily the "script" that describes additional editing operations, here the "script" portion of the edit list is empty or null. For example, in one implementation, the edit list includes a pointer that points to a remote image file having a higher (or lower) resolution than the digital negative or, in some cases, a resultant proxy image.

The capability for linking an edit list(s) from a low-resolution proxy resultant image provides substantial advantages for e-commerce applications. For example, photo content providers can distribute lower-resolution images for free via the Web or a CD that contain references back to the original high-resolution digital negative (s) that can reside either on a Web site, CD media, or other removable media. Photo Web sharing sites can also use this invention to enable users to link photos, or photo greeting cards (and other compositions such as multi-page albums) to the high-resolution image data and an optional "script" within the edit list for rendering of the photo (or card or album) at a higher-resolution.

An added security feature could also be provided that allows the high-resolution image to be locked with, for example, an encryption key to prevent unauthorized access unless the customer has actually purchased the rights to the given photo. It is a benefit of this invention that the "key" for how the high-resolution digital photo can be accessed is specified by the edit list (either embedded or linked) of the low-resolution proxy image. In addition, it has a further advantage that this meta-data could also include ordering information such as price, restrictions and the like.

It should be noted that an "edit list" of a multimedia asset, such as a digital image, can take many forms, such as for example, a single file representative of one digital negative and one separate XML file associated with the edit list for a given resultant image. In other cases, the edit list can be part of a file, referred to as a catalog file, that includes several different "edit lists" each being associated with a different multimedia asset. In one implementation, a catalog file can include several digital negatives (and their corresponding resultant images) and a single XML file that contains several different XML edit lists, one for each resultant image. In this way, the catalog file is an efficient approach for maintaining edit lists for a number of images in a single file.

The proxy image may also be obscured or "stamped" to render it unsuitable for printing or distribution, while still retaining the capability to access the original image if the user purchases such rights. The proxy image could also contain either a visible or invisible watermark, thus providing an additional form of identification and protection to the image.

It should be noted that both the digital negative and the resultant proxy image can be any industry-standard image formats (i.e. JPEG, PNG, GIF, etc) or even a proprietary file format (although not in the preferred embodiment) since the edit list and links between the images can be encoded in private meta-data embedded inside or externally linked to the image files. In this way, any application regardless whether or not it is cognizant of the invention is able to open and view any image that contain the private meta-data, since the resultant image contains a rasterized version of the image, albeit possibly a lower rendered resolution. Of course, however, applications that do recognize and support the invention will have the ability to re-render the image, as necessary, to achieve any desired result.

The invention provides for the ability to efficiently download lower-resolution images from the Web, but preserves the ability to be rasterized at a higher resolution either locally or remotely at a later time when needed, thus preserving the bandwidth.

In one embodiment, it allows a user to quickly download a low-resolution resultant image in an industry standard format (such as JPEG, PNG, TIFF, or others), but maintains the knowledge about how a higher resolution image can be created. In this case, the low-resolution resultant image has associated with it an edit-list of operations that must be applied to the digital negative. This allows for quick viewing, but with the option to obtain higher-resolution image data as needed.

It should be noted that this invention can be used to enhance the transmission of image data, no matter what the environment or transport medium. For example, downloading of user's images from a central Web site (such as Zing.com, PhotoNet, and other on-line photo communities/providers). This invention can also facilitate much improved transfer of images over a network in which two end user's computers are connected in a direct peer-to-peer fashion. Further, this invention can be used equally well, when transmitting images over a wireless network connection.

In another embodiment, a user can download a low-resolution "Intelligent e-Card" from a Web site represented as an industry standard JPEG that contains the rasterized composition of photos, cards, text, and any other multimedia assets. While the JPEG proxy image may be adequate for on-screen viewing or a preview print, the proxy image is embedded with knowledge about how the high-resolution artwork and/or photos can be accessed and composited, providing the application with the necessary information for the rasterization at a higher-resolution. The benefit is that a very small sized proxy image (such as an industry JPEG, PNG, TIFF, or other format) can be initially downloaded for review very quickly and at a later time, higher-resolution data can be accessed.

Assuming that a higher-resolution "e-card" is to be created, this invention permits the creation of the high-resolution data either locally on the client computing device or on a remote computing device (such as a server computer). In the case that rendering occurs on the client computing device, higher-resolution image data is obtained from the digital negative (s) and the edit lists are processed generating a higher resolution "e-card". Alternatively, the client computing device could request that the rendering be performed remotely (such as on a high-performance server), but where the rendered higher resolution "e-card" be subsequently transferred to the client computer in its final form. It should be noted that this architecture could be configured to meet the requirements of many different e-commerce sites. The low-resolution "Intelligent e-Card" could be watermarked, thus encouraging the user to purchase a higher-resolution representation. Further, since the low-resolution resultant image has the knowledge about how to recreate a higher-resolution version, the e-commerce site could require, when this high-resolution data is accessed, that the user purchased the rights to access and use the high-resolution data.

It should also be noted, this is not limited to greeting cards, but could also be applied to the creation and distribution of albums, calendars, and virtually any other creation that involves incorporation of photographs or other image data into a composition.

It should also be noted that in all these embodiment, several performance optimizations can easily be attained. In particular, when a photo or composition (such as a card, calendar, or album) is printed through a remote location, the customer (end user) may not even need to transmit much data from their local computing device. Although the customer may only have direct (local) access to a low-resolution proxy image, the resolution that best matches the output device (such as a high-resolution printer) will be rasterized based on the original digital negative and the edit list stored with the proxy image. More importantly, if the high-resolution image resides on the Web (such as Zing.com or PhotoNet) and output is going to a remote device (such as a printer at Kinkos), very little client bandwidth is required from the local user's computing device. Since the resultant image has associated with it the edit list and references to the digital negative(s) data, only that small amount of information must be transferred from the user's local computing device to the remote device (such as a print service).

In a particular video-based embodiment described below, the user is able to download and edit a low-resolution digital video stream from the Web. The video editing commands can be passed to the server for processing on the full-resolution video stream. The commands are associated with the low-resolution digital video stream that maintains a reference back to the high-resolution video stream on a server. At a later point in time, the editing commands can be processed on the high-resolution video steam remotely. This requires only a minimal amount of data to be transmitted (only the editing commands), resulting in less bandwidth and processor requirements on the client side.

In this way, the invention provides a very powerful distributed multi-resolution, and non-destructive imaging model. It is also platform, operating system, and device independent. Furthermore, it is extremely lightweight and compatible with many other standards. There are many unique aspects to this invention that will be realized after further review. The distributed characteristic of this invention is the unique aspect that provides the real flexibility and power not found in any application or system today. While this invention was originally developed for a digital imaging (still and video) consumer electronics devices, its applicability spans any computing device that performs operations on multimedia content.

Referring now to FIG. 1, a block diagram of a digital image processor system 200 in accordance with an embodiment of the invention is shown. Digital image processor system 200 includes an image source 202 arranged to provide any number of digital or analog image input signals for processing. The image source 202 can provide a digital image stream that can take the form of a still image (having a format such as JPEG or TIFF) as well as video from, for example, a digital television (DTV), a DVD, a CD, set top box (with satellite DSS or cable signal), the Internet (also commonly referred to as the WEB), and the like. In this way, a digital image source 204 can provide any number and type of well-known formats, such as, JPEG, BMP, TIFF, BNC composite, serial digital, parallel digital, RGB, or consumer digital video. When the digital image source 204 is a digital television, the input signal is a digital video signal having any number and type of well known digital formats such as, SMPTE 274M-1995 (1920×1080 resolution, progressive or interlaced scan), SMPTE 296M-1997 (1280×720 resolution, progressive scan), as well as standard 480 progressive scan video. Alternatively, as an analog image source 206, the analog signal provided includes analog signals derived from, for example, an analog television, still camera, analog VCR, DVD player, camcorder, laser disk player, TV tuner, scanner, set top box (with satellite DSS or cable signal), game machines, imaging kiosks, as well as the WEB, and the like.

In order to convert the analog signal provided by the analog image source 206 to an appropriate digital signal, an analog-to-digital converter (A/D) 208 coupled to the analog image source 206 converts an analog voltage or current signal into a discrete series of digitally encoded numbers (signal). In this way, a digital image data word suitable for digital processing is thereby generated. Any of a wide variety of A/D converters can be used, such as for example those manufactured by: Philips, Texas Instrument, Analog Devices, Brooktree, and others.

Figure 3A:
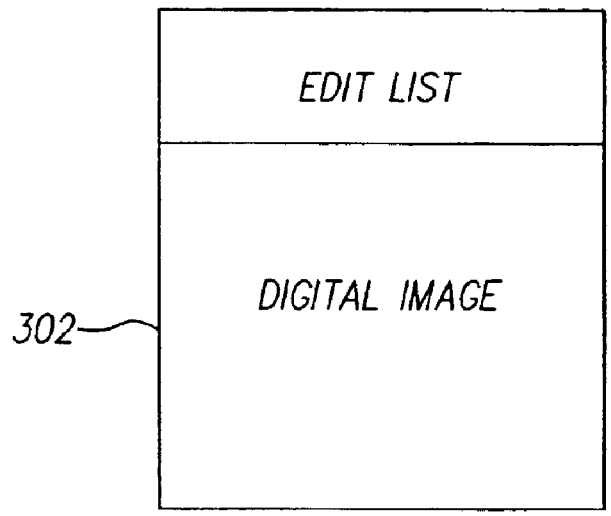
FIGS. 3A and 3B are examples of resultant proxy image files and associated edit list files in accordance with an embodiment of the invention.
Figure 3B:
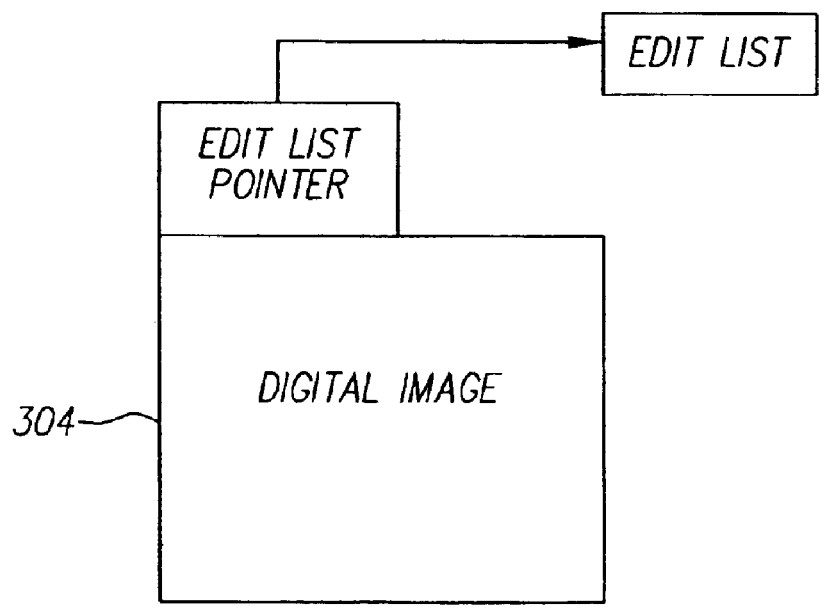

In the described embodiment, a selector unit 209 selects the digital image stream from either the digital image source 204 or the A/D converter 208 to form an input digital image stream 210 to a digital image processing engine 212. Such an engine can be implemented as described in more detail with reference to FIGS. 4–6. In some cases, the input stream 210 has embedded therein digital image in the form of a digital negative also referred to as a reference. In other cases, however, the digital image embedded in the input stream 210 can take the form of a resultant proxy image 300 (i.e., modified image file) having either an embedded edit list file 302 as illustrated in FIG. 3A or having a pointer that identifies an external edit list file 304 as shown in FIG. 3B. In either case, the edit list files 302 and 304 provide a pixel by pixel image processing instruction set operable on corresponding pixels in the associated digital negative.

In the described embodiment, an external edit list source 213 provides external edit list data to the digital image processing engine 212. The external edit list source 213 can represent any number and type of devices suitably arranged to provide appropriately configured edit list data used to modify an associated digital image. Such devices include, but are not limited to, user interface (UI) controllers (at the control of an application or other device), a resultant proxy image generator (such as a digital still camera having embedded image processing capabilities), commands to a server computing device from a client computing device, printers and other like peripheral devices that generate system commands (for example, re-rasterizing a particular digital image to suit a particular printing need), and other devices well known to those skilled in the art. In the preferred embodiment, an open standard such as XML is desired. However, any other format, open or proprietary, can be used to represent the "edit list".

The image processing engine 212 operates on the digital image embedded in the incoming digital image stream 210 based, in part, upon the accompanying edit list data, if any. For example, in the case where the digital image embedded in the input stream 210 is a digital negative type image (i.e., a reference image), then the incoming digital negative generally has no associated edit list data (since it is by definition an image to be used as a reference). This is typically the case when the image processing engine 212 detects that the incoming digital image has no associated edit list data. In this case, the image processing engine 212 treats that incoming digital image as a reference digital image and passes it through to an output unit 216 without further processing.

When the image processing engine 212 detects that the incoming image is a resultant proxy image (i.e., one that has been modified), the image processing engine 212 then determines the method of association (i.e., whether the corresponding edit list data is embedded in the incoming image file as an edit list (as illustrated in FIG. 3A), if the image file points to the appropriate edit list file (as illustrated in FIG. 3B), or has been generated by an external source (such as a UI control, printer, or other imaging device)) and not actually associated with the resultant image in any way.

The edit list data associated with the resultant image is identified and known to be of the specific format known by the image processing engine 212. Of course, it is possible for a digital negative or the resultant image to include other data as required by an application that could be ignored by the image processing engine 212 if it is deemed irrelevant. This may be the case when file formats are developed that embed other types of data in the edit list in its preferred embodiment as an XML file format.

It is particularly advantageous that an edit list (commands for the specific imaging operations) of operations that are applied to a given photo are included in a particular edit list file can be stored with the resultant image. This arrangement allows for those operations identified by the edit list to be reapplied to the digital negative, if desired. It also provides a way for the user to "undo" certain operations or "disabled" or otherwise turn off certain operations that have been applied to the photo. In so doing, this mechanism allows these operations to be reapplied at any resolution such that higher quality results can be achieved.

In some cases, however, the image-processing engine 212 detects external edit list data only that is supplied by, for example, a printer. In such cases, the image processing engine 212 is capable of using the external edit list data file to process any selected image file based upon the external edit list data. For example, if a particular printing job requires a printed image to be enlarged from the original, then the associated edit list can have re-rasterizing instructions which have the effect of scaling the original image to whatever size is deemed to be appropriate. In the described embodiment, the image processing engine 212 processes the received digital image according to the instructions (if any) included in any edit list associated with (embedded in or pointed to by) the incoming image file. When the image processing engine 212 modifies an incoming digital image based upon acquired edit list data, the modified image can be either a modified resultant proxy image with an embedded edit list or it can be a modified resulting proxy image that points to an edit list file having the appropriate edit list data in the form of an edit list, for example.

In the case of a printer generated edit list and the incoming image file is a digital negative, then the image processing engine performs the image processing operations from the edit list (such as enlarging the image) on the incoming digital negative and then passes it to an output selector 214. In the cases where the incoming resultant image file has its own edit list either embedded in or pointed to, then the image processing engine 212 performs the image processing operations accordingly on only those pixels in the incoming digital image so identified by the corresponding edit list data in the edit list associated with the resultant image as well as those editing commands generated by the printer (such as enlarging the original). In both of these cases, a physical "resultant image" might not saved, but passed through to the printer port 220 for output.

The use of the externally generated edit list could also serve other purposes. For example, an application or device (such as a printer) could allow the user to toggle viewing/output display states. For instance, suppose every displayed output image should have an imaging operation applied (such as color adjustment needed for a de-saturation step before display on an NTSC television). These commands could be use as input to the edit list source 213 and automatically applied to all photos processed. In some situations, where the images are not saved, but printed (or just displayed), a physical resultant image might not be persisted (beyond an intermediate image/file that is sent to the printer or display).

In a similar way, the edit list source 213 could be driven by an application or device to allow for batch operations. For example, when images are first uploaded to a Web site, each photo could be automatically processed (made better via AutoFix imaging operation) when they are uploaded. However, in this case, the original digital negative could be preserved, but with a modified resultant image that contains an edit list of operations (such as AutoFix) with the link back to the original digital negative.

In any case, all output image streams are output to the output selector 214 and based upon user supplied selection criteria, one of the output image streams is selected to form an output image stream 215. In the described embodiment, the output image stream 215 forms an input to an output unit 216 that is coupled to external circuitry that can include an image display unit 218 capable of displaying the image provided by the output unit 216. In still other cases, the output unit 216 can be coupled to an output port 220 capable of being coupled to other external circuitry (not shown) such as a computer that, in turn, provides an appropriate display apparatus. In the described embodiment, the output port 220 includes I/O ports such as a parallel port, a serial port, a system bus, a USB port, 1394, SCSI, a TV signal output port, a PCMCIA port, network port (to connect to the Internet), as well as a modem port. As such, the output port 220 can also be arranged to transmit the image provided by the output unit 216 (in a format such as raw RGB, JPEG, TIFF, PostScript, a proprietary image format, etc.) to an interconnected network of computers (such as the Internet). In this way, any of the interconnected computers can be used to, for example, view the image embedded in the image stream 215 thereby allowing any number of end-users to view the embedded image.

It is a particular advantage of the inventive digital image processor system 200 that the image is processed (rendered) at whatever resolution is required by a particular output device (i.e. display, printer, etc.). The mechanism for accessing and rendering of an image to the desired resolution is through an encoding mechanism that links the digital negative and an edit-list of operations that have been applied to the resultant proxy image. This provides the benefit for the user to view (and process) a much smaller proxy image file as necessary, but with the ability to access the original digital negative and rasterize it at any resolution. Furthermore, the proxy image (if it is stored in a JPEG format or an alternate format as desired) can serve both as a container that holds the reference to the digital negative and the edit list as well as a standard image file that can be viewed using a conventional application.

Figure 2:
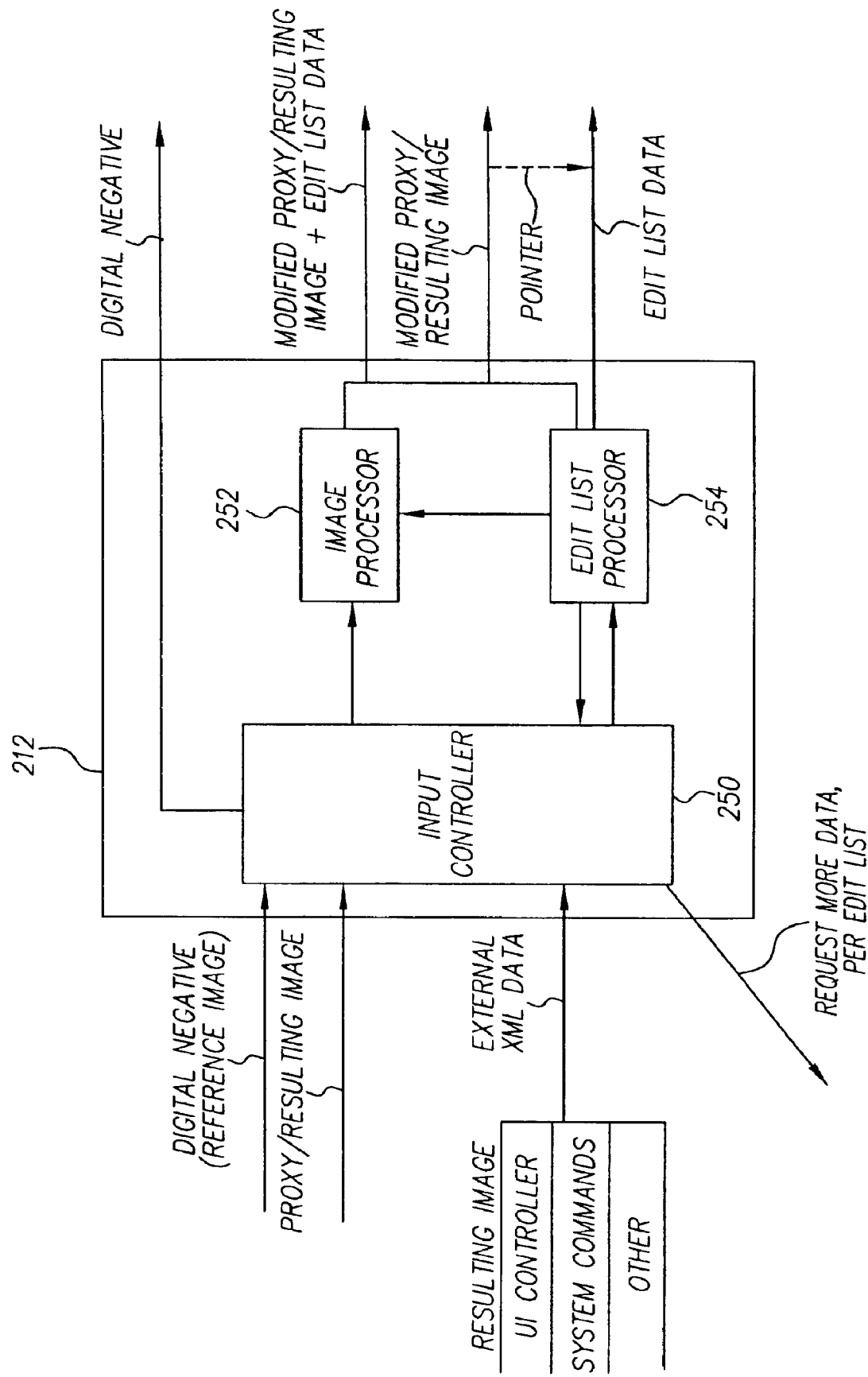
FIG. 2 illustrates a particular implementation of the image processing engine shown in FIG. 1.

FIG. 2 illustrates a particular implementation of the image processing engine 212 in accordance with an embodiment of the invention. As implemented, the image processing engine 212 includes an input controller 250 coupled to an image processor 252 and an edit list processor 254. In operation, the input controller 250 determines whether or not a received input signal is a resultant proxy image, a reference image, or an external edit list data file. In the case when the input signal is a reference image (digital negative) and no external edit list data is supplied, the input controller 250 outputs the reference directly to the output unit 216 without further image processing.

In the case when the input signal is a reference image (digital negative) and there is external edit list data is supplied (such as from a printer), the input controller 250 passes the appropriate edit list data to the edit list processor 254. When edit list data is supplied, the edit list processor 254 will ask the input controller to request the necessary files (other referenced edit lists). Once the input controller obtains the necessary files, they will be passed to the image processor 252. The image processor 252 then uses the image processing operations provided by the edit list processor as defined by the embedded edit list data to modify the original digital negative image to form a resulting proxy image with embedded edit list data in one case or in another case a resulting proxy image that points to an external edit list data file provided by the edit list processor 254.

On the other hand, if the input signal is a resultant proxy image with embedded edit list data, then the input controller 250 passes the appropriate edit list data to the edit list processor 254. When edit list data is supplied, the edit list processor 254 will determine from the edit list data how to access the original digital negative and ask the input controller to request the necessary files. Once the input controller obtains the necessary image files, they will be passed to the image processor 252. The image processor 252 then uses the image processing operations provided by the edit list processor as defined by the embedded edit list data to modify the original digital negative image to form a resulting proxy image with embedded edit list data in one case or in another case a resulting proxy image that points to an external edit list data file provided by the edit list processor 254.

When the edit list processor 254 must process several different edits list (such as one referenced by the resultant image (or possibly multiple ones recursively referenced) or from an external device (such as a printer), the edit list processor will have to generate an accumulated edit list that represents sum of all edit operations. In the preferred embodiment, XML is used, however, other format are equally valid. If there are conflicts between the various edit lists, the application will need to reconcile these differences and process the edit list as is required.

In those cases where the resulting proxy image points to an edit list file or where the edit list data is in the form of an external edit list file, the image processing engine 212 uses the pointer to generate a reference (such as a URL) to locate and download the appropriate edit list file(s). The retrieved edit list data is then used by the edit list processor 252 to generate the resulting proxy image accordingly.

It should be noted that if the input controller 250 cannot access the original digital negative(s), other multi-media assets, or retrieve other parts as described in the edit list, the image processor 252 can, at the direction of the controlling application, directly output the original inputted proxy image. In this way, the user will still see a version of the output image, even though it has not been re-processed.

It should also be noted that if the image processor 252 cannot process the commands specified by the edit list processor 254 for what ever reason, the image processor 252 can, at the direction of the controlling application, directly output the original inputted proxy image. In this way, the user will still see a version of the output image, even though it has not been re-processed.

It should also be noted that the edit list data associated with a reference proxy image can point to multiple digital negatives and other multimedia content used in the creation of the reference proxy image. This can include vector images (such as PostScript, EPS, or PDF), raster images (such as JPEG, TIFF, or PNG), text strings, video, sound, and the like.

Figure 4:
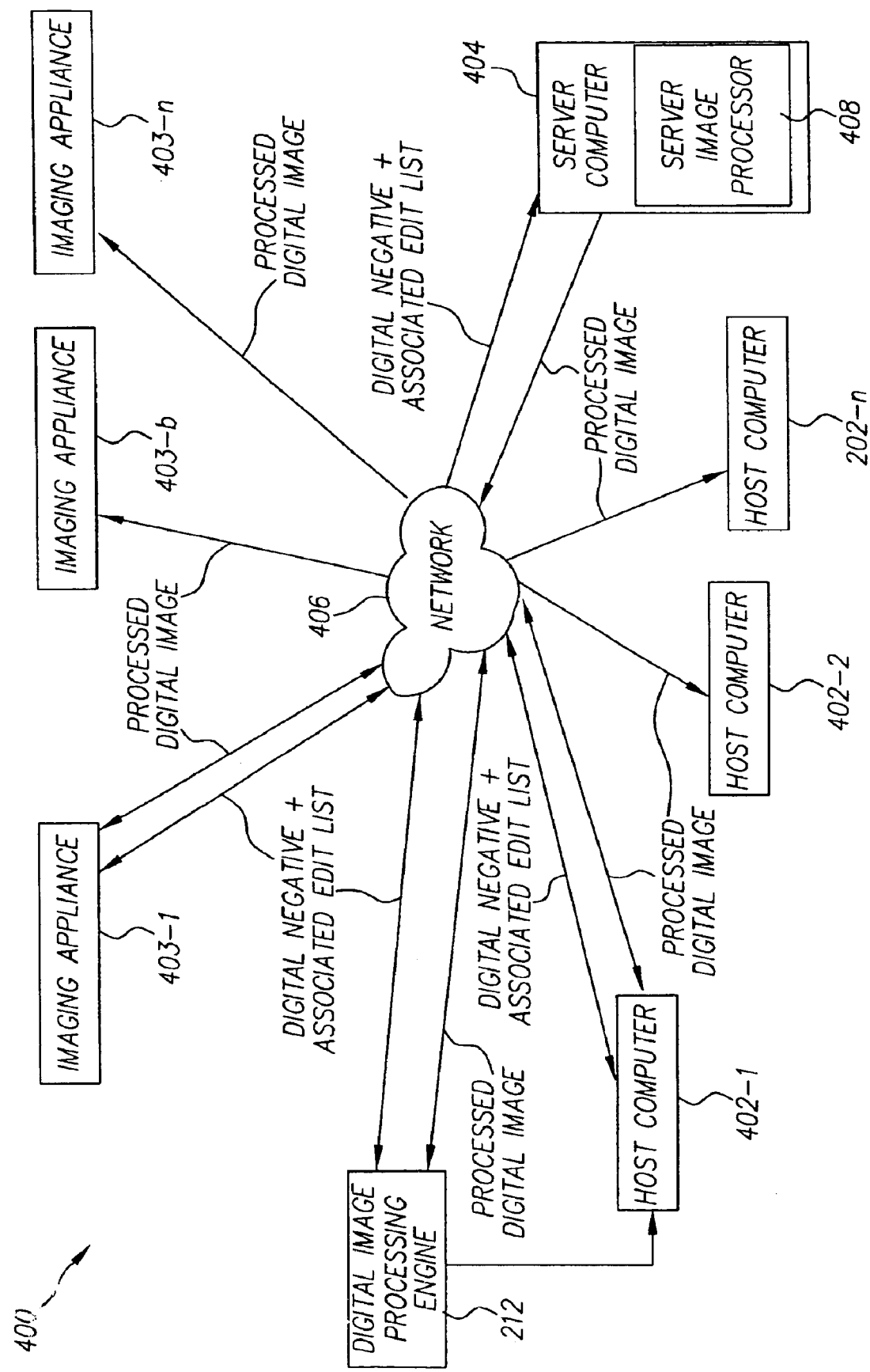
FIG. 4 shows a distributed system in accordance with an embodiment of the invention.

Referring now to FIG. 4 showing a distributed system 400 in accordance with an embodiment of the invention. In the distributed system 400, the image processing engine 212 is coupled to a host computer 400-1 by way of the output port 220. The host computer 400-1 can be, in turn, coupled to a server computer 404 by way of a network 406 or other host computers 400-2 through 400-n or an imaging appliance 403-1 through 403-n. It is also possible that an imaging appliance 403-1 (such as a digital still or digital video camera, set-top box, game machine, or photo appliance), which has embedded inside of it an image processing engine 212, can be coupled to a server computer 404 by way of a network 406 or other host computers 400-1 through 400-n or other imaging appliances 403-2 through 403-n.

Further, it is also possible that the image-processing engine 212 can be directly connected to the network 406, independent of computer 400-1 through 400-n.

The network 406 can take the form of a distributed network of interconnected computers, such as can be found in the Internet, or it can be a small scale intranet type system found in, for example, small companies and the like. In the described embodiment, the server computer 404 can include a server image processor unit 408 arranged to perform high speed image processing operations based upon edit list data, for example, found in an edit list associated with a particular image file. The server image processor unit 408 is arranged to perform those image processing operations that are either too time consuming or resource intensive to be efficiently performed on the host computer 400-1 or the imaging appliance 403-1.

One such case is when a high resolution rendered image with all operations applied (with maximum quality imaging algorithms) is stored in the standard resultant image file (i.e. JPEG). Associated with this JPEG file (either embedded or linked externally) is the edit list (commands for the specific imaging operations) and reference to the original digital negative. Using this arrangement, a conventionally configured application can ignore the edit list and digital negative reference and simply display the resultant image. It is one of the advantages of this invention that allows an application or other device that does not implement this described system to still have the ability to display the proxy resultant image (at whatever resolution it was saved). However, the application or other device that does not implement this described system can not take advantage of all the other advantages of this invention.

In the described embodiment, the digital image processing engine 212 can be included in any of a number of digital appliances 403-1 such as for example, a digital still or digital video camera, set-top box, game machine, photo appliance, and the like. Using the example of a digital still camera, instead of storing the high-resolution resultant image, an application may decide to store only the low-resolution resultant image. For the case of a digital camera based application, this may be more desirable given the memory and processor constraints of the embedded system. For this case, the user can still choose the image operations as specified in the edit list, but only a low-resolution resultant image is generated and stored locally, in addition to the original digital negative In some cases, such as when the digital image processing engine 212 is part of a set-top box with limited or no local storage space, all components, both digital negative and the low-resolution resultant image with its edit list could be stored remotely on the network.

This has several benefits. First, the amount of processing power (and internal memory requirements) of either the local computing device or the remote computing device (where ever the image processing occurs) is reduced since much fewer pixels are processed. Second, the size of the resultant image file is much smaller since only a low-resolution (or thumbnail) version of the image is persisted. Most importantly, the original digital negative is preserved, along with the smaller resultant image. This is critical since digital camera storage is very constrained. In this case, the original digital negative will be saved and a lower-resolution (and much smaller) resultant image with its associated edit list will be saved to the digital still camera.

Once the image has been processed, the low-resolution resultant image can be sent over the network 406 to any number of other host computers 400-1 through 400-n or imaging appliances 403-1 though 403-n for viewing on their respective displays. This has the advantage of only consuming a limited amount of bandwidth for the transfer of the lower-resolution thumbnail image through a low-bandwidth connection. However, at the request of the application, the original digital negative could be accessed such that the edit operations could be reapplied to generate a higher-resolution resultant proxy image.

Depending on the capabilities of the host computer or the imaging appliance, this processing could either occur on the host computer 400-1 or imaging appliance 403-1, or on one of the system attached to the host computer via the network 406, such as another the server image processor unit 408 that is part of the server 404.

It should be noted that for either case described above, the file that contains the edit-list could take on several forms. It may be desirable to generate a JPEG file that contains the resultant image and embeds the edit-list and the reference to the digital negative. This has the benefit that the user has one encapsulated file to maintain. Another approach involves creation of an edit list file that contains the edit-list, the reference to the digital negative, and a reference to the resultant image (possibly a JPEG file that may or may not include metadata about the edit-list and/or reference to digital negative). A third approach would involve the complete encapsulation of not only the resultant image and the edit list, but also a digital negative. This could take the form of an image file (JPEG, TIFF, etc.) or a general "collection" file (such as a compressed ZIP or JAR (Java Archive)). This may be desirable as a distribution mechanism, but maintains the properties described by this invention. It should also be noted that with any of these variants, multiple resolutions may also be stored (embedded or linked) at the application's discretion.

With conventional Web editing techniques, if a user is editing a photo that resides on the Web, the entire image must be downloaded and processed locally. However, this invention allows for a more efficient alternative approach that calls for a low resolution-image to be downloaded from the remote computing device (such as the server computer 406) and processed by the local computer device (such as the host computer 402-1 or photo appliance 403-1). The higher resolution image data would only be required by local computing device and downloaded from the remote computing device if needed. For example, referring to FIG. 4, a user working on a local computing device (such as a photo appliance 403-1 without access to local storage) can efficiently save changes to the server computer 404 over the network 406 even when the network 406 is a low bandwidth network such as a modem. This results in much less bandwidth, assuming only a low-resolution resultant image is transmitted with the edit list and other metadata to the remote computing device (such as the server computer 406). Alternatively, the user may choose to save the resultant image locally with the edit list, in for example, the host computer 400-1 with a link to the original digital negative that can be reference at any node in the network 406.

Another advantage of the distributed nature of this invention is that the actual image operations can be processed either locally in any of the local computing devices (such as the host computer 402-1 or photo appliance 403-1) or a remote computing device (such as the server compute 404), as required by the application. It also is possible to accommodate a mixed mode model in which the low-resolution image is processed locally (performing the commands in the edit list), but a high-resolution image is processed using the same edit list remotely on the server computer 404.

The invention will now be described in terms of a digital appliance, such as a digital camera having relatively small LCD screens for display and viewing. Since, the LCD screens are very small and only require a low-resolution image, processing of the image is only performed on a thumbnail or low-resolution image and the digital negative will be saved to the camera's memory card.

Figure 5:
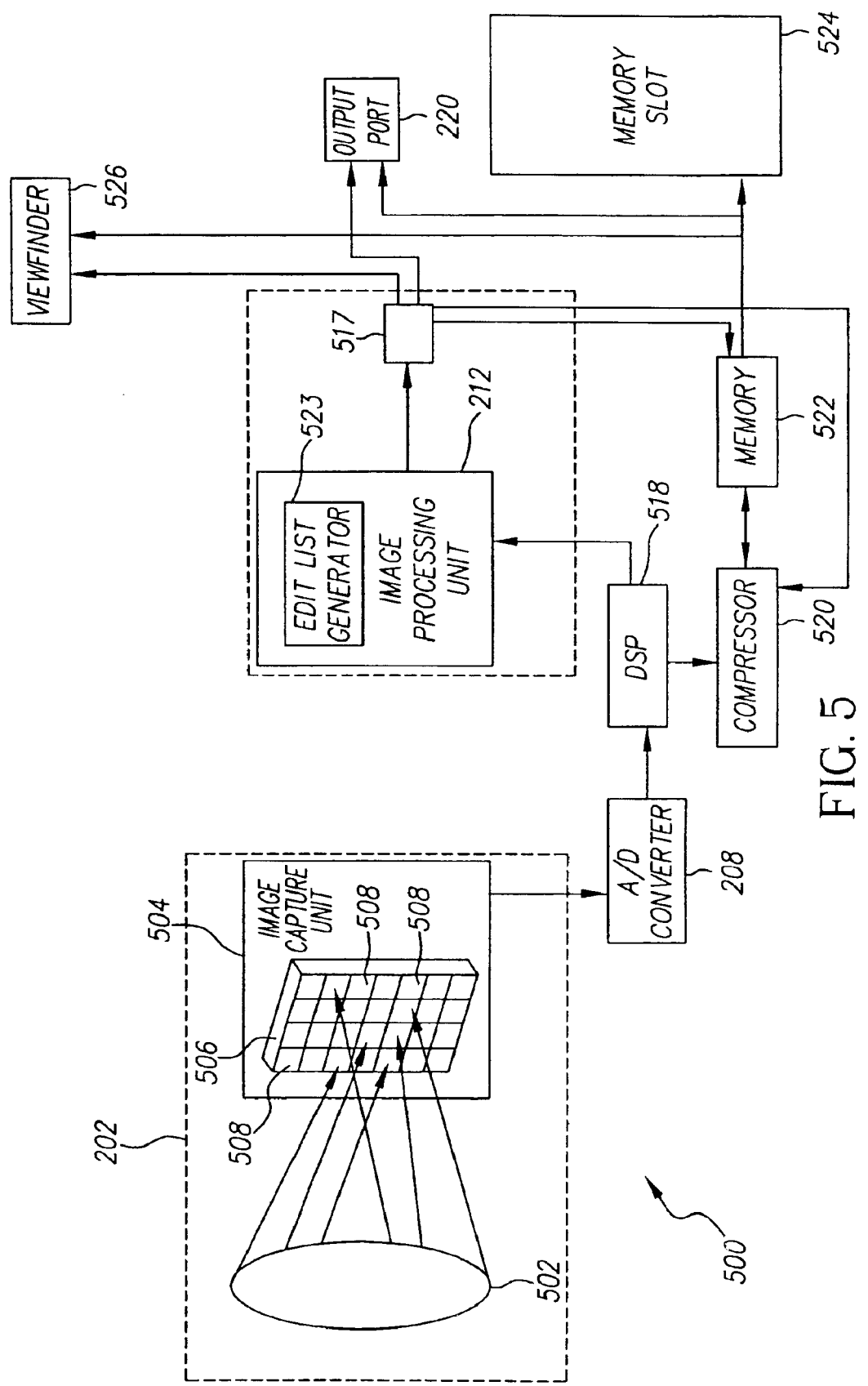
FIG. 5 shows a digital camera system in accordance with an embodiment of the invention.

Referring to FIG. 5, a digital camera system 500 in accordance with an embodiment of the invention is described. In this example, the camera system 500 is capable of color correcting digital images either on the fly or after the fact. In some cases, it may be advantageous to generate an edit list describing the color correction, such as an ICC profile, that is required in conjunction with an uncorrected reference image, thus preserving the original digital negative. Also stored will be a resultant image, most likely of a low-resolution thumbnail image with the color correction applied such that it can be displayed on the LCD of the camera. The uncorrected reference image (digital negative) along with the edit list can then be downloaded to either a local host computing device or can be sent to a remote computing device for further image processing. Alternatively, if transmission of the digital negative is not possible, the resultant proxy image, along with the edit list, can be transmitted and displayed on local host computing device or remote computing device. At a later time, the edit list, which is associated with the resultant proxy image can be processed and applied to the digital negative, which is referenced from the edit list.

Typically the digital camera system 500 includes the image source 202 that includes an optical lens 502 for focusing light rays onto a imaging capture unit 504. The imaging capture unit 504 typically relies upon an array of light sensitive photo optic cells 506 capable of converting the light rays, in the form of photons, received from the optical lens 502 into representative analog signals. Most commonly, the photo optic cells take the form of charge coupled devices (CCDs), although other devices such as CMOS receptors may be used as well.

As is well understood in the art, each CCD array 506 has associated with it a specific color filter array (CFA) 508 . In most applications, the CFA 508 is an empirically derived pattern of individual color filters each associated with a specific CCD cell in the CCD array. When the analog signals representative of the captured image are produced by the image capture unit 504, they are sent first to an analog to the digital (A/D) converter unit 208 which converts the representative analog signals into digital signals representative of the image. The digital signals are then passed to a digital signal processor (DSP) 518 where they are converted to an appropriate digital format.

In some embodiments of the invention, an image compression circuit 520 as well as a memory 522 both receive the appropriately formatted digital signals. The image compression circuit 520 operates to digitally compress the received digital images in order to reduce the amount of resources required to further process the digital signals. One such formatting scheme referred to as JPEG is commonly used, although there are a wide variety of suitable picture formats.

In one embodiment, the digital image stored in the memory 522 can be sent by way of a memory interface (not shown) to a memory slot 525 capable of receiving a memory card suitable for storing the processed digital signals. Such memory cards include "floppy" disks, flash EPROM cards, R/W compact disc (CD), SmartMedia, CompactFlash, Sony's MemoryStick, DVD, DAT, and the like. Alternatively, the digital image stored in the memory 522 can be sent to external circuitry, such as a computer, by way of the output port 222 for viewing or, in some cases, additional image processing. In the situation where a number of images are stored in the memory 522, a user can pre-select any number of images for additional processing by viewing the images (generally in a thumbnail form) using a viewing device such as a viewfinder 526.

In the case where the digital image is to be processed by an external computer, for example, an edit list generator 523 generates an edit list consistent with those color corrections required to compensate for the ambient light conditions. The edit list generator 523 can either embed the edit list in the reference image or it can create a separate edit list which is associated with the reference digital image, by for example, a pointer.

If it is determined that the digital image is not to be processed by the image processing unit 212 , then the image stored in the memory 522 can be directly sent to either the display unit 526, to a device coupled to the memory slot 525, or to external circuitry, such as a computer, by way of the output port 222. In this case, the external computer can actually perform the color correction as indicated by the edit list generated by the edit list generator 523.

In the case where the output device includes a printer, the user is able to print out the photos captured with the digital camera 500. If the user is printing out a digital negative, those photos can be directly printed as specified by the user. However, if the user prints out photos that have been modified that contain only a low-resolution thumbnail, it may not be at a high enough resolution to meet the needs of the printer. For this scenario, the printer can re-rasterize the image by applying the edit list to the original digital negative to obtain high quality output results as desired.

It should be noted that the invention also provides for a very efficient means of describing a print job that allows rasterization to occur at the printer. Typically, an application (or print driver) rasterizes an image (or composition of images) to the specific print resolution locally on the client, that is then output to the printer. While this approach is acceptable for local, client-side printing, it is clearly inefficient for server-side remote printing.

An alternative approach involves sending the edit list and references to the digital negative(s) (the contents associated with the resultant image), to the server for processing. These operations can then be reapplied to the digital negative to produce the desired print resolution on the server. This approach clearly preserves bandwidth because the fully-rasterized image is not sent to the print server. This is particularly important if the print job involves any vector-based artwork that contains a highly compressed description of a page layout.

Additionally, the invention is well suited for printing of "package prints." As well known in the art, package prints are those in which one photo is printed on a variety of different print layout templates (i.e. one 5×7 and two 3×4). If only one photo is printed, but to several different orientations and sizes, only one copy of the photo must be transferred. Equally important, it reduces the amount of processing power required on the client side since the rasterization can be off loaded to the server.

Figure 6:
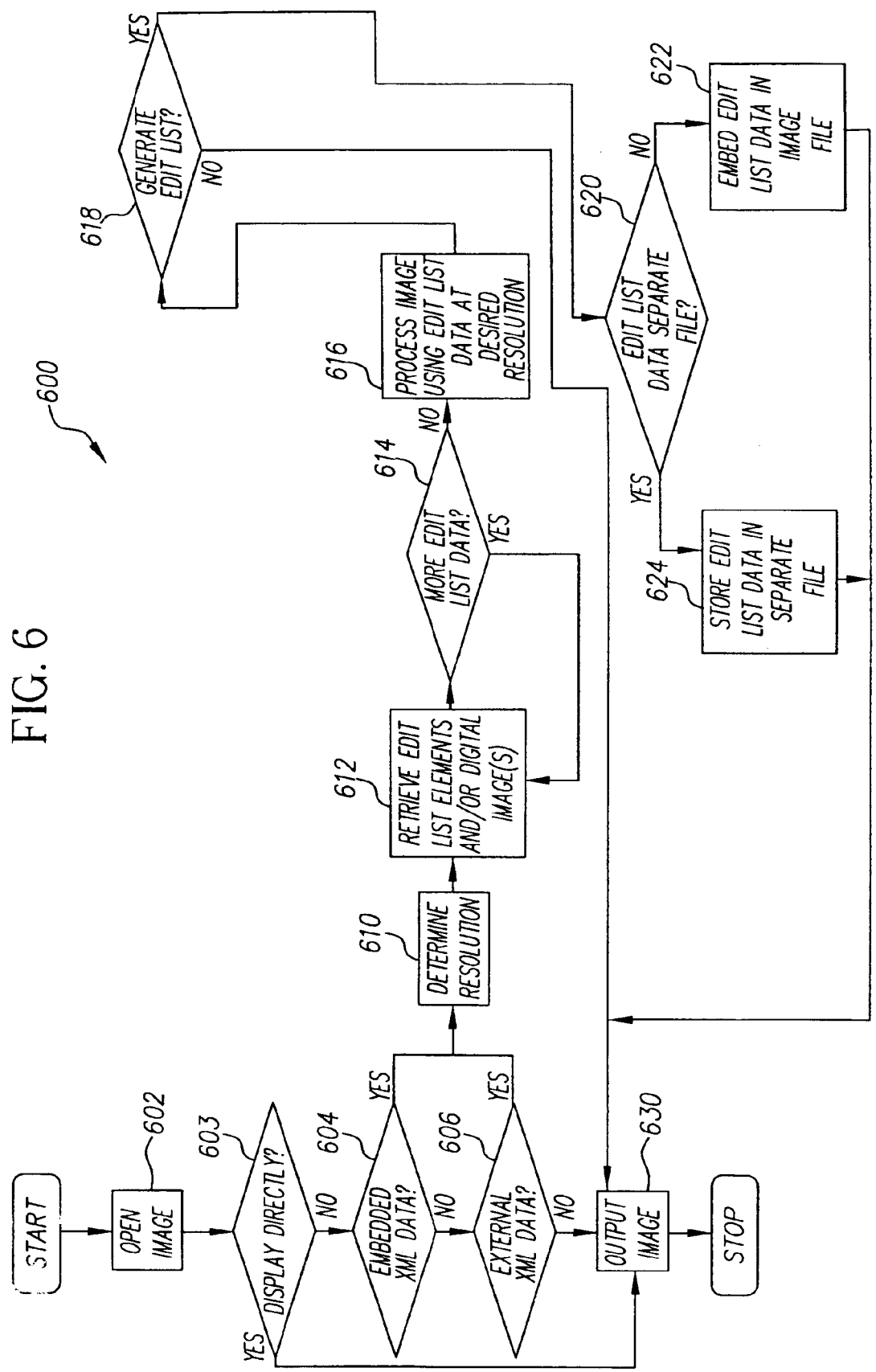
FIG. 6 shows a flowchart is shown detailing a process carried out by the digital image processing engine shown in FIG. 1.

Referring now to FIG. 6, a flowchart is shown detailing a process 600 processing a digital image by the digital image-processing engine in accordance with an embodiment of the invention. The process 600 begins at 602 when a particular digital image is opened by the image-processing engine. At 603, a determination is made if the image should be directly displayed, without any further processing, in which case control is passed to 630 where the image is passed to the output device for display (or print or to a file). This could occur in several circumstances. If the application does not have knowledge of this invention, it will simply display the image. If the application does have knowledge of this invention, but wants to quickly display the contents of the image, whether it is a resultant proxy image or the digital negative (an image without any associated edit list), it can bypass any additional processing and simply display the image.

If the image should not be directly displayed, then at 604 and 606, a determination is made if there is an edit list data embedded in or if external edit list data is referenced to, respectively, the opened image file. If it is determined that there is no embedded or referenced edit list data with the associated digital image, then control is passed to 630 where the image is passed to the output device for display (or print or to a file).

If it was determined that there was either embedded or referenced edit list data associated with the input digital image, then at 610 a determination is made to what the desired output resolution should be. Once this is known, then at 612 the first edit list element is processed and any necessary digital negatives are retrieved at the resolution appropriate based on the value determined in 610. At 614 a determination is made to see if additional edit list elements or more digital negative elements are to be retried, and if so, control is passed back to 612. Otherwise, control is pass to 616 where the edit list elements and digital negative(s) are processed, based on the desired resolution determined in 610, resulting in a new output image.

At 618, a determination is made whether or not the edit list data associated with the resultant output image generated at 616 should also be generated. In many cases, this will simply be the original edit list processed at 612. If no edit list data is to be generated, the image generated from 616 is passed to 630 where the image is passed to the output device for display (or print or to a file).

If an edit list is to be generated, a determination is made at 620 whether it should be embedded with the image file or external as a separate file. If the edit list data is determined to be embedded, then the edit list data is embedded in the resultant proxy image at 622, otherwise the edit list data is stored in an associated edit list file, such as, for example, an edit list at 624. Regardless, control is then pass to 630 where the image is passed to the output device for display (or print or to a file).

It should be noted, if the resolution generated (and requested at 610) does not exactly match the output device, it may be necessary to resample the output image to match the output device. While the most accurate results would be achieved if the image were re-rasterized, based on the edit list and digital negative(s), this may not always be done. For example, when the user zooms in/out to/from an image, it may be desirable to quickly resample the image to get the desired resolution as needed.

Figure 7:
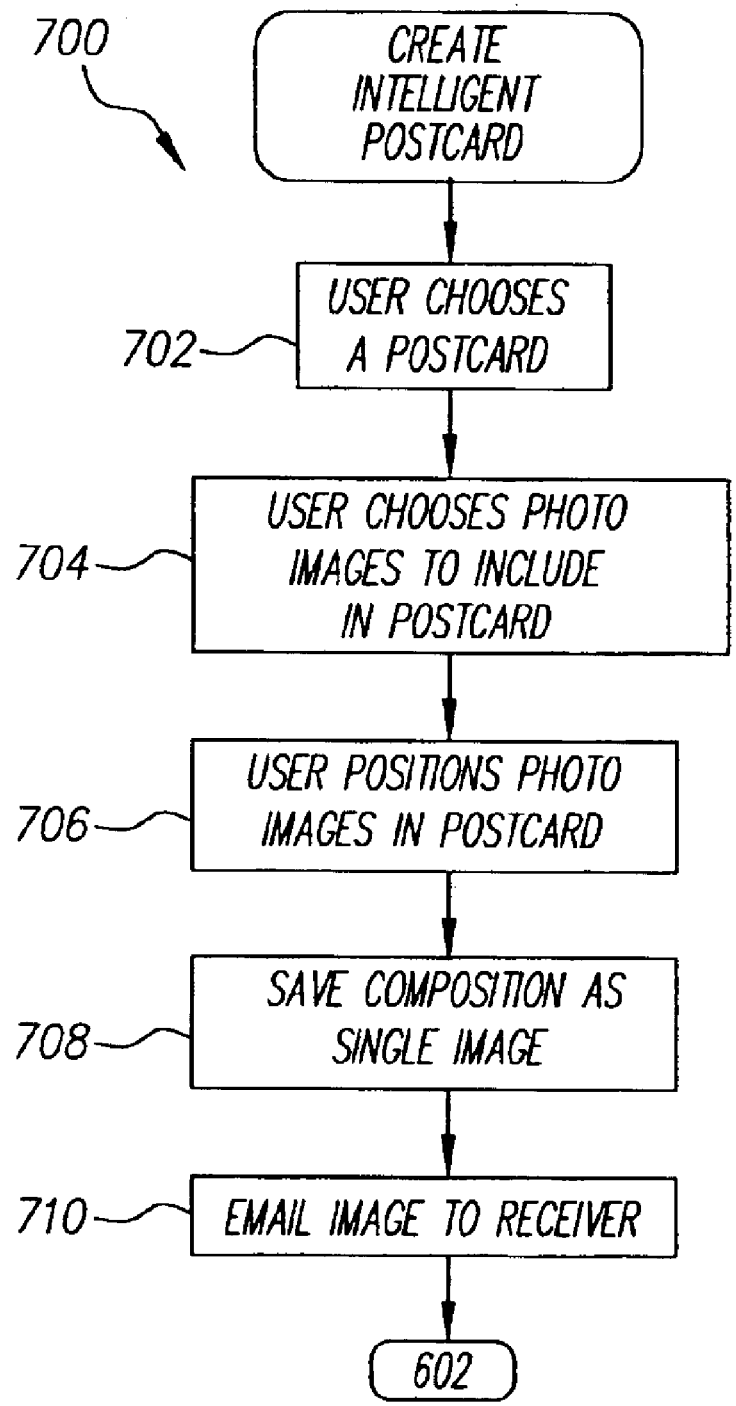
FIG. 7 illustrates a flowchart detailing a process whereby a user creates a intelligent "e-card" in accordance with an embodiment of the invention.
Figure 8:
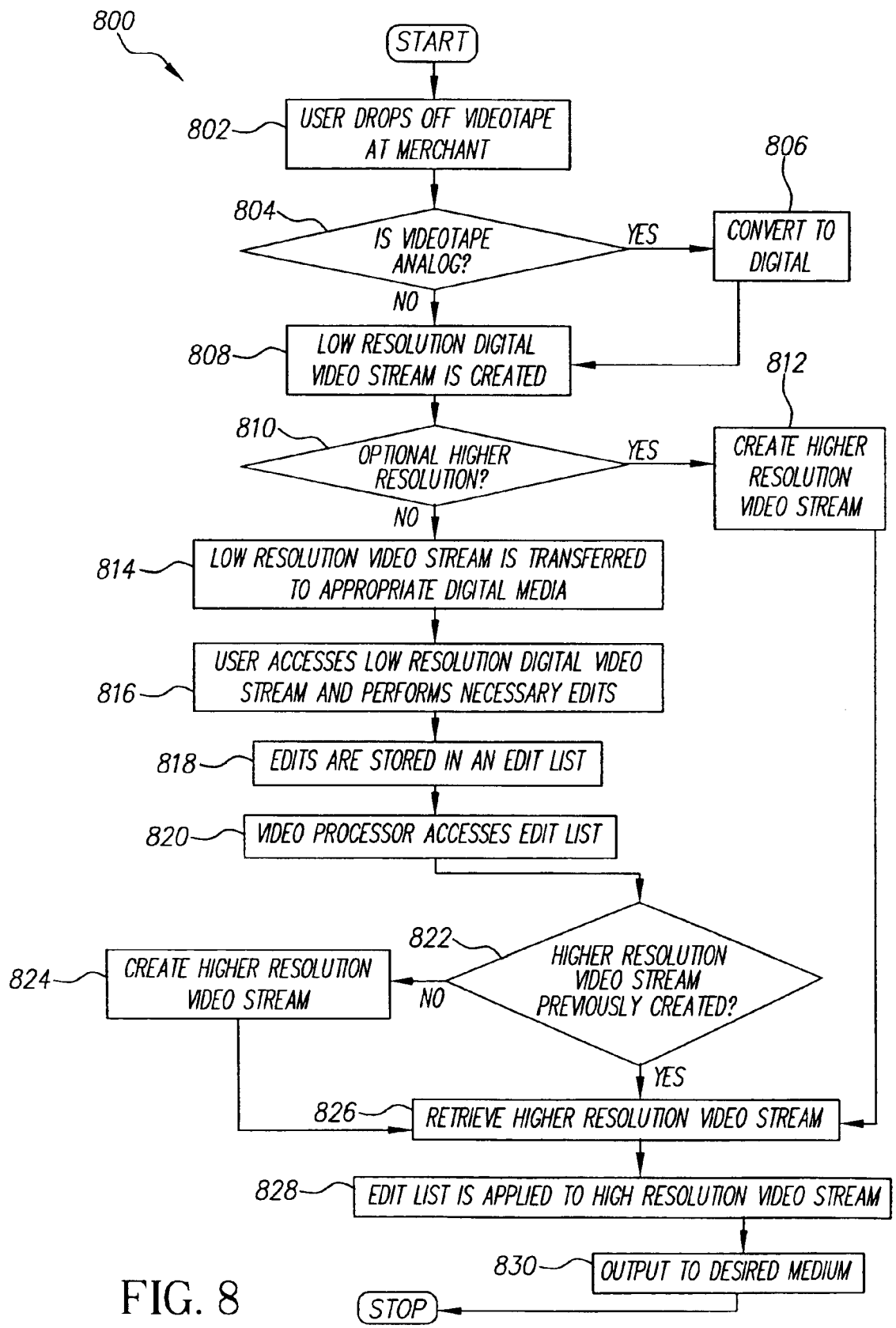
FIG. 8 illustrates a process for facilitating efficient video editing in a distributed environment in accordance with an embodiment of the invention.

In a particular scenario, a user creates an intelligent "e-card" as detailed by flowchart of a process 700 as illustrated in FIG. 7 in accordance with an embodiment of the invention. The process 700 can be carried out in any suitably arranged digital appliance, such as for example, the digital imaging set-top device 500 described above with reference to FIG. 4 in conjunction with the distributed network 400. Therefore, a user chooses a postcard, for example, at 702 while choosing photo image(s) at 704 to be included in the postcard. Once selected, the user positions the photo images inside the selected postcard at 706, which may involve zooming and panning the photo inside the composition. Once satisfied, the composition is saved as a single image at 708 at a low resolution. In addition at 708, the edit list will also be saved, either embedded inside or associated with, the generated resultant proxy image. Once saved, the user can email the image to the receiver(s) at 710. Control is then passed to 602 when the image can be opened FIG. 8 illustrates a process 800 for facilitating efficient video editing in a distributed environment in accordance with an embodiment of the invention. At 802, a user drops off a videotape (in digital or analog format) to a video processor or merchant that supports this process. At 804, a determination is made if the videotape is in analog format or digital format. If in analog format, the tape is converted into digital format at 806. In either case, control is then pass to 808 where a low-resolution digital video stream is created as well as determining at 810 whether a higher resolution video stream is to be created If a higher resolution video stream is to be created, then the higher resolution video stream is created at 812, otherwise, the low resolution video stream is either placed on a CD, DVD, or other digital media (or uploaded to the network where it can be accessed) at 814. At 816, the user accesses the low-resolution digital video stream and performs the necessary edits (most likely from an video application or consumer electronics device at home or a kiosk in a store). At 818, these edits are stored an edit list in an appropriate format (such as XML or other compact open format) such that they can be provided to a video processor. At 820, the video processor accesses the edit list generated in 818, either through the network or some read-write media provided by the customer. At 822, a determination is made whether or not a higher resolution video stream is available (i.e., made available at 812) or is required at a different resolution than is currently available. If a higher resolution video stream is not currently available or a different resolution is required, then the higher resolution or different resolution video stream is created at 824. In any case, at 826, the higher resolution video stream is retrieved and at 828, the edit list is applied to a higher-resolution video stream (i.e., rasterization of video stream based upon the edit list at the appropriate resolution). At 830, the merchant outputs the results from the rasterization of the edit list at the desired resolution to an appropriate output medium, such as DVD, CD, digital or analog tape, so the user can view the edits they had performed on the low-resolution video stream, but rendered at a much higher resolution output.

Figure 9:
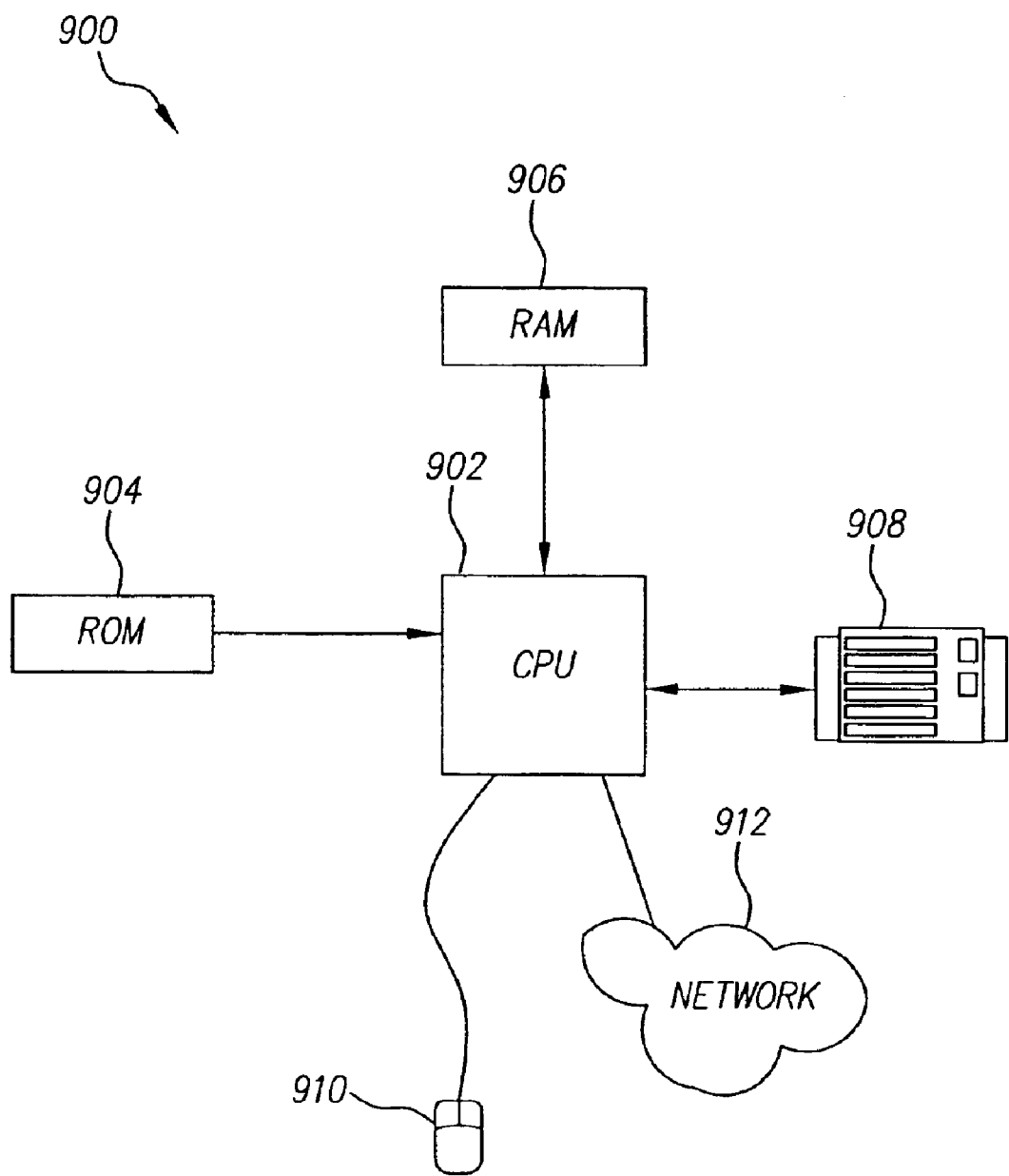
FIG. 9 illustrates a computer system or any imaging-enabled computing appliance/device that employed to implement the invention.

FIG. 9 illustrates a computer system 900 or any imaging-enabled computing appliance/device that employed to implement the invention. The computer system 900 or, more specifically, CPUs 902, may be arranged to support a virtual machine, as will be appreciated by those skilled in the art. As is well known in the art, ROM acts to transfer data and instructions uni-directionally to the CPUs 902, while RAM is used typically to transfer data and instructions in a bi-directional manner. CPUs 902 may generally include any number of processors. Both primary storage devices 904, 906 may include any suitable computer-readable media. A secondary storage medium 908, which is typically a mass memory device, is also coupled bi-directionally to CPUs 902 and provides additional data storage capacity. The mass memory device 908 is a computer-readable medium that may be used to store programs including computer code, data, and the like. Typically, mass memory device 908 is a storage medium such as a hard disk or a tape which generally slower than primary storage devices 904, 906. Mass memory storage device 908 may take the form of a magnetic or paper tape reader or some other well-known device. It will be appreciated that the information retained within the mass memory device 908, may, in appropriate cases, be incorporated in standard fashion as part of RAM 906 as virtual memory. A specific primary storage device 904 such as a CD-ROM may also pass data uni-directionally to the CPUs 902.

CPUs 902 are also coupled to one or more input/output devices 910 that may include, but are not limited to, devices such as video monitors, track balls, mice, scanners, PC-card readers, digital cameras, digital video, remote control units for TVs, VCRs, DVD players, and the like, keyboards, microphones, touch-sensitive displays, transducer card readers, magnetic or paper tape readers, tablets, styluses, voice or hand/writing recognizers, or other well-known input devices such as, of course, other computers. Finally, CPUs 902 optionally may be coupled to a computer or telecommunications network, e.g., an Internet network or an Intranet network, using a network connection as shown generally at 912. With such a network connection, it is contemplated that the CPUs 902 might receive information from the network, or might output information to the network in the course of performing the above-described method steps. Such information, which is often represented as a sequence of instructions to be executed using CPUs 902, may be received from and outputted to the network, for example, in the form of a computer data signal embodied in a carrier wave. The above-described devices and materials will be familiar to those of skill in the computer hardware and software arts.

While the present invention has been described as being used with a digital image or video system, it should be appreciated that the present invention may generally be implemented on any suitable digital image system. Additionally, this invention is not limited to digital images, but extends to any image type where a high-resolution data object representation can be approximated by a lower-resolution proxy image, including video imaging application and systems as well as audio systems.

It should be noted that the digital negative itself could be a standard image file type (JPEG, TIFF, PNG, etc.) or a propriety image format. Alternatively, the digital negative could be a recursive resultant image that points to multiple digital negative(s) and its associated edit list. This provides a powerful mechanism in which a low-resolution proxy image could be subsequently edited and/or placed inside a print job, package print, card, or digital album. Then an application, or server application, that supports this invention will be able to reapply all the editing operations recursively to generate the highest quality output image as required by the output device. For those applications that do not support this invention, they will be able to print the top most resultant image that is the composition of all recursively added inner images.

The resultant proxy image may also be a standard image file type (JPEG, TIFF, PNG, etc.) or a proprietary image format, with a resolution specified by the application that creates the resultant proxy image. It is also possible in some cases that a resultant proxy image does not even exist (or is "empty" with out a physical pixel representation). As described above, the edit list of operations may describe a print layout template with the associated digital negatives (and possible edit list of editing operations) and other multimedia assets. In this case, the creation of the resultant image is not needed since the printer service will process the edit list and its associated digital negatives and other assets and generate the desired output. As a convenience, this could be represented as a blank JPEG file with an embedded or externally linked edit list.

It should be also noted that the edit list could be persisted through many different mechanisms. The preferred embodiment uses XML (extensible Markup Language), but other formats, both standard and proprietary could be used to implement this invention. Further, this edit list can either be included with the resultant image or linked to it via a separate file.

The distributed nature as described in the recursive example above also provides a powerful and flexible workflow such that separate designers can work on different parts of this recursive structure without effects to the others.

Therefore, the present examples are to be considered as illustrative and not restrictive, and the invention is not to be limited to the details given herein, but may be modified within the scope of the appended claims along with their full scope of equivalents.

What is claimed is:

1. In a distributed system, an on-demand method of transferring a lower resolution resultant image from a first node to a second node that preserves an ability to form a higher resolution resultant image at the second node, comprising:

at the first node,
(a) generating a first resultant image at a first resolution;
(b) rasterzing the first resultant image to form a second resultant image at a second resolution;
(c) transferring the second resultant image to the second node;

at the second node,
(d) selecting a third resolution;
(e) rasterizing the second resultant image to form a third resultant image at the third resolution;
(f) retrieving a digital negative of an original digital image;
(g) modifying the digital negative to form the first resultant image at the first resolution;
(h) associating a first edit list based on the modifying with the first resultant image;
(i) linking the first edit list to the digital negative;
(j) modifying the first resultant image to form the second resultant image at the second resolution;
(k) associating a second edit list based on the modifying (j) with the second resultant image at the second resolution and the first resultant image; and
(l) linking the second edit list to the digital negative.

* * * * *